Figure 1:
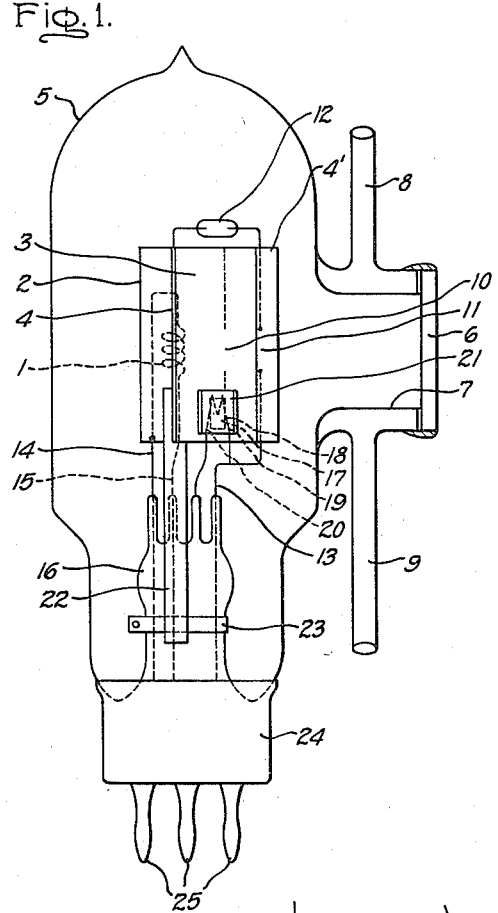

May 10, 1955  J. BELL  2,708,247

HYDROGEN-FILLED ELECTRIC DISCHARGE DEVICE

Filed May 2, 1952

Inventor:
James Bell,
by Vernet C. Kauffman
His Attorney.

United States Patent Office 2,708,247
Patented May 10, 1955

2,708,247

HYDROGEN-FILLED ELECTRIC DISCHARGE DEVICE

James Bell, Pinner, England, assignor to General Electric Company, a corporation of New York Application May 2, 1952, Serial No. 285,671

Claims priority, application Great Britain May 11, 1951

1 Claim. (Cl. 313—175)

This invention relates to gas-filled electric discharge lamps and similar devices, and is concerned in particular with such devices in which at least part of the gaseous filling is hydrogen.

A common cause of failure in the operation of devices of this kind is the reduction of the pressure of the gaseous filling due to "clean-up" of the hydrogen on the envelope and electrodes of the device, which below a certain pressure results in an increase in the potential difference between the cathode and anode for a given discharge current. This increased potential difference may itself result in failure to operate, or the increased temperature of the anode which results may cause the liberation of gases from the anode which poison the cathode.

Various proposals have been made for providing a reservoir of hydrogen in devices of this kind to replenish the gaseous filling and thus to prolong the useful life of the devices.

The reservoir may, for example, be in the form of a substance which evolves hydrogen on heating and reabsorbs hydrogen on cooling, the substance being maintained during operation of the device at such a temperature as to maintain the pressure of the gaseous filling of the device substantially constant. Suitable substances for this purpose are, for example, the hydrides of zirconium, titanium, tantalum, vanadium and thorium. In the complete specification of copending cognate British patent applications Nos. 6,642/49 and 3,804/50, it has been proposed to use such a substance as a reservoir of hydrogen and to dispose it within the envelope of a device in a position such that its temperature during operation of the device varies in the same sense as the temperature of the anode of the device, the substance being disposed inside a sealed container whose permeability to hydrogen increases with increase of temperature and which is substantially impermeable to hydrogen at the normal temperature of the container when the device is not operating. A container of this kind is necessary in order to prevent absorption by the reservoir of considerable quantities of hydrogen from the gaseous filling of the device when the device cools during a period of non-operation. If such absorption took place, failure of the device might occur when operation restarted, even though the reservoir of hydrogen had not been exhausted.

A device of the kind described in the above-mentioned specification will normally be designed so that the tempearture of the container under normal operating conditions at the maximum designed loading of the device is such as to maintain the pressure of the gaseous filling at a value not greatly in excess of that at which failure of the device may occur. If the loading of the device is reduced, the temperature of the container will be reduced, and the pressure at which the gaseous filling is maintained will also be reduced. If the loading of the device is reduced more than a certain extent, the pressure of the filling may be reduced to the point at which the device will fail to operate satisfactorily.

It is an object of the present invention to provide a gas-filled thermionic device of the kind specified and provided with a reservoir of hydrogen in the form described above, in which means are provided for increasing the range of loadings over which satisfactory operation of the device may be insured.

According to one aspect of the invention, therefore, a gas-filled electric discharge device comprises a sealed envelope provided with a gaseous filling part at least of which is hydrogen, at least one pair of electrodes for the passage of a discharge through the filling in operation of the device, a hydrogen replenisher in the form of sealed container whose permeability to hydrogen increases with increase of temperature and which is substantially impermeable to hydrogen at the temperature which the container has when the device is not operating, the container having disposed within it a substance which evolves hydrogen on heating and re-absorbs hydrogen on cooling. The container is mounted in heat-receiving relationship to one of the electrodes, being disposed within the envelope of the device in a position such that the temperature of the container during operation of the device varies in the same sense as the temperature of that electrode. Further, there is provided an auxiliary heater arranged when energized to supply heat to the said container, whereby during operation of the device at loadings less than the maximum normal loading, the temperature of the container can be maintained by energization of said auxiliary heater at substantially the same temperature as the container attains in normal operation of the device at the said maximum loading without energization of the auxiliary heater.

In the case of a device adapted for D. C. operation and having for the said pair of electrodes an anode and a cathode, the container is preferably associated with the anode; in the case of a device adapted for A. C. operation, the electrodes are usually similar and operate at substantially the same temperature, and it is immaterial with which the said container is associated.

The auxiliary heater may be arranged in close proximity to the container so as to heat it directly when energized, or the heater may be arranged to heat the container indirectly, for example, by being arranged in close proximity to a part of the electrode structure of the device on which the container is mounted, from which part heat is transmitted to the container by conduction; or the container may be arranged to be heated by thermal radiation from such a part.

One arrangement in accordance with the invention in which a hydrogen reservoir and associated auxiliary heater are employed in a hydrogen-filled high intensity lamp designed for D. C. operation, is illustrated in the accompanying drawings, and will now be described by way of example.

Figure 2:
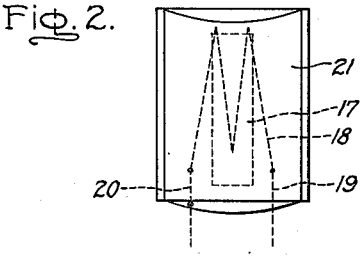
Figure 3:
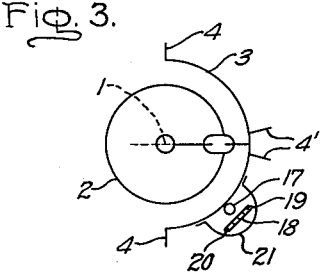
Figure 4:
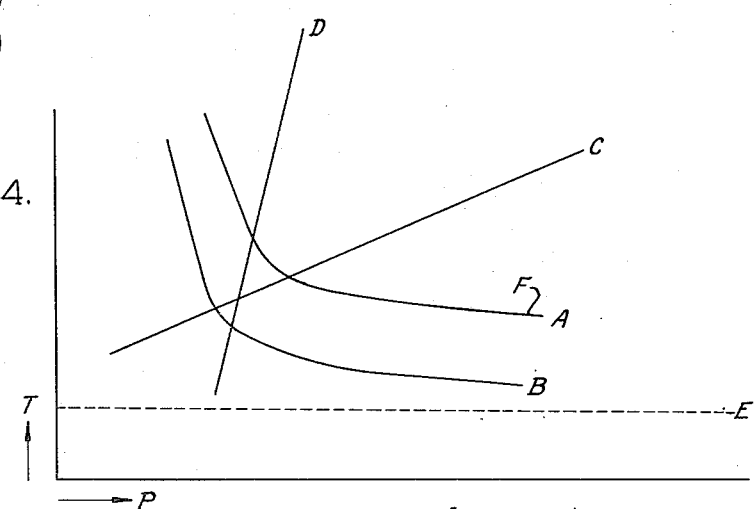

In the drawings, Fig. 1 is a side elevation of a hydrogen-filled high intensity lamp in which parts hidden from view are indicated by broken lines; Fig. 2 is an enlarged view of a part of Fig. 1 showing the hydrogen reservoir and auxiliary heater; Fig. 3 is an enlarged plan view of the electrode assembly of the lamp shown in Fig. 1; and Fig. 4 is a diagram illustrating the method of operation of the lamp. Corresponding parts in Figs. 1, 2 and 3 are indicated by the same numerals.

Referring to Figs. 1, 2 and 3, the lamp shown in Fig. 1 comprises a cathode 1, in the form of helix of molybdenum-tungsten alloy coated with electron emissive material, surrounded by a nickel cylinder 2, which is closed at each end, and a hemicylindrical nickel anode 3, which has side flanges 4 and to which are fitted nickel cooling fins 4'. These electrodes are contained in a sealed glass envelope 5 which is initially provided with a hydrogen filling at a pressure of 5 mms. of mercury and has a quartz window 6 cemented by wax onto a side tube 7 which is provided with tubes 8, 9 for the circulation of cooling water for the cemented seal. The cylinder 2 and the anode 3 are provided with slits 10, 11 for permitting light emitted by the anode-cathode discharge to emerge through the window 6. The anode is supported at one end from the cylinder 2 through an insulating glass bead 12, and at the other end by the anode lead 13 which passes, together with the common cathode leads 14 and 15, through the pinch 16.

A sealed nickel tube 17 containing zirconium hydride powder is attached to the outer surface of the anode by spot welding, and an auxiliary heater 18 in the form of a molybdenum ribbon, bent to the shape of an inverted W, supported at each end by stout nickel wires 19, 20, is located close to the nickel tube, the wire 19 being connected to the anode lead 13 and the wire 20 passing through the press or pinch 16. The tube 17 and heater 18 are enclosed within a nickel hemicylinder 21, which is closed at the top and bottom and which is spot-welded to the outer surface of the anode, the heater lead 20 passing for insulation through an aperture at the bottom of the hemicylinder 21.

The cylinder 2 is supported, in addition to support provided by the leads 14 and 15, by means of nickel bands 22 which are secured to a nickel band 23 fastened around the stem or foot tube below the pinched end 16 thereof, and the construction of the lamp is completed by the cap 24 and terminal pins 25 to which one of the leads 14 and 15, the anode lead 13, and the heater lead 20 are all connected. All the leads are of nickel except the parts within the pinch, which are of copper-clad platinum.

The zirconium hydride contained in the nickel tube 17 will decompose on heating, with consequent evolution of hydrogen: the evolution of hydrogen is considerable over a range of temperatures from 350–650° C. and, although it is less at higher temperatures, it may not be complete until a temperature of about 900° C. is reached.

The operation of the lamp will now be described with reference to Fig. 4 of the drawings in which the temperature T of the anode is plotted as ordinate against the pressure P of the hydrogen filling as abscissa. The curve A represents the operational relationship between T and P when the lamp is run at its designed maximum loading, while the curve B represents the operational relationship between T and P when the lamp is run at a somewhat lower loading without any auxiliary heating of the anode. The curve C represents the relationship (for a particular hydrogen content of the zirconium hydride) between the pressure P of the hydrogen filling at which the zirconium hydride is in equilibrium with the hydrogen filling and the temperature T of the zirconium hydride, assumed in this case to be the same as that of the anode. The region to the left of the line D in Fig. 4 is that in which operation of the lamp will be unsatisfactory. The permeability of the nickel tube to hydrogen increases substantially logarithmically with increase of temperature, but below a temperature of about 250° C., represented in Fig. 4 by the line E, the nickel tube is substantially impermeable to hydrogen, Assuming initially that the lamp is operating at its maximum loading, the envelope will be filled with hydrogen at the beginning of its life at a pressure P such that the initial conditions of operation are represented by the point F on the curve A, the temperature T at this point being about 400° C. During further operation the hydrogen pressure P will fall, and the operating point will move to the left along the curve A, until the hydrogen filling is in equilibrium with the zirconium hydride, the operating point then being at the intersection of the curves A and C corresponding to a temperature T of about 450° C.

If the hydrogen pressure P tends to fall thereafter due to "clean-up" of the hydrogen, equilibrium will be restored by liberation of hydrogen from the zirconium hydride to replenish the hydrogen filling. The consequent reduction in the hydrogen content of the zirconium hydride will tend to reduce the hydrogen pressure P at which equilibrium will be re-established, but this tendency will be counteracted to some extent by the increase of the temperature T which will result from movement of the operating point to the left along the curve A and which will tend to increase the hydrogen pressure P at which equilibrium will be re-established. The net effect is that as "clean-up" of the hydrogen from the filling occurs, the operating point will move very slowly to the left along the curve A. Provided that the initial hydrogen content of the zirconium hydride is sufficiently high, the hydrogen pressure P will in fact be maintained sufficiently steady to insure that the life of the lamp is not limited by "clean-up" of hydrogen from the filling.

If the loading of the lamp is reduced to the point at which the operational relationship between the temperature T of the anode and the hydrogen pressure P is represented by the curve B, then in the absence of any auxiliary heating of the anode the eventual operating point, after some clean-up of hydrogen has occurred, will be on the curve B near its point of intersection with the curve C. Since this point lies to the left of the line D in Fig. 4, unsatisfactory operation of the lamp will result. In order to avoid this the auxiliary heater is brought into operation so as to maintain the temperature T substantially at the value which it would have under normal operating conditions if the lamp were operating at its maximum loading. By this means the operating curves for light loadings of the lamp may in effect be raised so that they occupy approximately the same position as the curve A in Fig. 4, thus insuring that the normal operating points at these loadings lie to the right of the line D in Fig. 4.

It will be appreciated that in the use of a device in accordance with the invention at low loadings, the auxiliary heater need not necessarily be used to maintain the hydrogen evolving substance and container at a temperature as high as that reached in normal operation, though that is usually preferable, since satisfactory operation at somewhat lower temperatures, corresponding to positions of the operating curve between B and A in Fig. 4, may still give satisfactory operation. In particular, the auxiliary heater need not be used where the loading of the lamp is only slightly below its designed maximum. Thus, the arrangement in accordance with the present invention does not suffer from the difficulties associated with other forms of hydrogen replenishment device where a reservoir of hydrogen is heated by a separate heater and where it is necessary to control the voltage of that heater very closely in order to obtain precise control of the pressure of the hydrogen filling. This is due to the fact that in the arrangement according to the present invention the temperature of the hydrogen reservoir varies in accordance with that of the anode so that small variations in the hydrogen pressure, due for example to "clean-up" of hydrogen, are automatically compensated for.

It will be appreciated that during a period of non-operation the temperature T of the anode, and therefore of the zirconium hydride, will drop, but that no appreciable re-absorption of hydrogen by the zirconium hydride will occur at such a time since the nickel tube will become substantially impermeable to hydrogen at temperatures below about 250° C.

In an alternative arrangement from that described with reference to Figs. 1, 2 and 3, the nickel tube may be arranged to be heated by direct thermal radiation from the anode instead of being secured to the anode. In other arrangements the sealed container may be in a form other than that of the tube, for example, it may itself be partially constituted by a part of the anode.

In manufacture, the nickel container is filled with zirconium hydride, is preferably evacuated, sealed, and, in the case where the container is not partly constituted by part of the anode, is then secured in position. The use of a tubular construction for the nickel container is convenient since the container may be sealed after evacuation by a cold welding process similar to that which may be used in sealing off devices having a metal pumping stem. The electrode structure of the lamp is assembled in the normal manner and after the usual outgassing process the envelope is filled with hydrogen to the desired initial pressure.

Although zirconium hydride has been referred to in the above-described specific embodiment of the invention, it is to be understood that other substances which evolve hydrogen on heating may be used, such as the hydrides of titanium, tantalum, vanadium, and thorium, the choice of substance to be used being dependent upon the temperature range over which appreciable hydrogen evolution is required, which will in turn be determined by the operating conditions of the particular device concerned. Similarly the container in which the reservoir of hydrogen is disposed may be of a metal other than nickel, for example, copper, iron or palladium, and part only of the container need be of a material which is permeable to hydrogen at the appropriate temperature. Although in the above-described embodiment hydrogen was the sole constituent of the gaseous filling of the device, it will be understood that the invention is also applicable where hydrogen constitutes only part of the gaseous filling.

What I claim as new and desire to secure by Letters Patent of the United States is:

A gas-filled electric discharge device which comprises a sealed envelope provided with a gaseous filling part of which is hydrogen, electrodes in said envelope for the passage of a discharge through the filling in operation of the device, a hydrogen replenisher in the form of a sealed container whose permeability to hydrogen increases with temperature and which is substantially impermeable to hydrogen at the temperature which the container has when the device is not operating, the container having disposed within it a substance which evolves hydrogen on heating and reabsorbs hydrogen on cooling and being disposed within the envelope of the device and attached to one of said electrodes in direct heat conducting relationship therewith, and an auxiliary electric heater sealed within said device and mounted adjacent said container.

References Cited in the file of this patent

UNITED STATES PATENTS

| | | |
|---|---|---|
| 1,096,390 | Regaud | May 12, 1914 |
| 1,566,279 | King | Dec. 22, 1925 |
| 2,528,547 | Reilley et al. | Nov. 7, 1950 |

OTHER REFERENCES

Jossem: "Admission of Pure Gases to Vacuum Systems," pages 164 to 166, Review of Scientific Instruments, volume II, May 1940.